US011033149B2

(12) United States Patent
Bartlett

(10) Patent No.: US 11,033,149 B2
(45) Date of Patent: Jun. 15, 2021

(54) PORTABLE COOKING GRILL WITH FOLDING TABLE PANELS FOR COMMUNAL GRILLING

(71) Applicant: Reliance Products Ltd., Winnipeg (CA)

(72) Inventor: Glenn Jack Bartlett, Winnipeg (CA)

(73) Assignee: Reliance Products Ltd., Winnipeg (CA)

( * ) Notice: Subject to any disclaimer, the term of this patent is extended or adjusted under 35 U.S.C. 154(b) by 106 days.

(21) Appl. No.: 16/580,677

(22) Filed: Sep. 24, 2019

(65) Prior Publication Data

US 2021/0085126 A1 Mar. 25, 2021

(51) Int. Cl.
*A47J 37/07* (2006.01)

(52) U.S. Cl.
CPC ....... *A47J 37/0763* (2013.01); *A47J 37/0704* (2013.01); *A47J 2037/0777* (2013.01)

(58) Field of Classification Search
CPC .......................... A47J 37/0704; A47J 37/0763
See application file for complete search history.

(56) References Cited

U.S. PATENT DOCUMENTS

| | | | | |
|---|---|---|---|---|
| 5,218,950 A | * | 6/1993 | Hait | A47J 37/0704 126/25 R |
| 6,725,855 B1 | * | 4/2004 | Brennan | A47J 37/0763 126/276 |
| 2003/0029436 A1 | * | 2/2003 | Carden | A47J 37/0786 126/41 R |
| 2005/0252504 A1 | * | 11/2005 | Cabrera | A47J 37/0704 126/50 |
| 2011/0094493 A1 | * | 4/2011 | Malumyan | A47J 37/0763 126/25 R |
| 2017/0311756 A1 | * | 11/2017 | Liu | A47J 37/0704 |

* cited by examiner

*Primary Examiner* — Alfred Basichas
(74) *Attorney, Agent, or Firm* — Christopher J Dynowski; Ryan W Dupuis; Ade & Company Inc.

(57) ABSTRACT

A portable cooking grill includes four folding side panels each at a respective side edge of a rectangular container which can be folded down for transport and folded up to act as a table surface at which a person can be seated. A support stand attached to the container has a first erected position in which the container is supported in a raised position for use by a plurality of seated diners at the side panels and a second collapsed position in which the support stands is folded toward the base of the container. A heat shield arrangement is located around the container to prevent overheating of the seated diners. The support stand allows the container and folded side panels to be supported in a horizontal position or in a vertical position for storage.

19 Claims, 8 Drawing Sheets

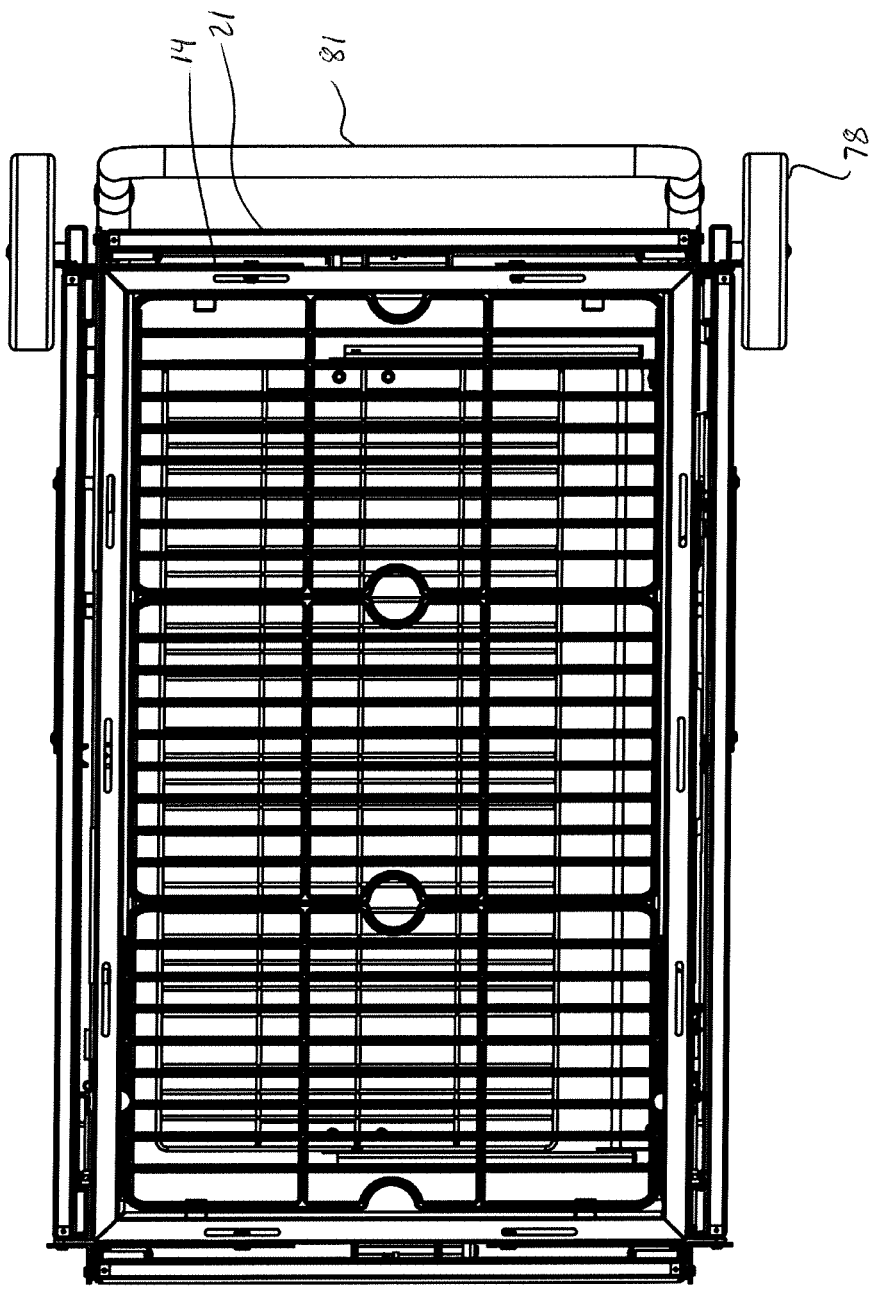

PORTABLE COOKING GRILL WITH FOLDING TABLE PANELS FOR COMMUNAL GRILLING

This invention relates to a portable cooking grill which includes folding side table panels allowing the panels to act as table surfaces for diners seated around the grill.

BACKGROUND OF THE INVENTION

Typically grills provide a cooking surface within a container where the cooking is done at an independent location and dining is moved to a separate table for receiving the seated diners.

However recent developments have included:
a mechanism for a collapsible dolly style wheeled base which is used on a gas grill barbecue system.
a portable combination grilling and adjacent table surface which does not have a collapsible wheeled base or four table sides.
a multi or four table side cooking and eating surface but no transport or storage mechanism.
a charcoal grill surface with prep tables and scissor lift but no fold-down table sides and features like heat shield.

There remains opportunities for further improved cooking grills with enhanced features.

SUMMARY OF THE INVENTION

According to the invention there is provided a cooking grill comprising:

a rectangular container defining an upper combustion area;

a cooking surface over the upper combustion area for receiving and supporting food materials to be grilled by receiving heat from the combustion area below the cooking surface;

the container having four upstanding side walls and a base confining the combustion area;

each side wall having a side panel mounted thereon for pivotal movement of the side panel about an axis along the side wall;

so that each side panel has a first horizontal position with a latching arrangement holding the side panel projecting outwardly from the side wall with an upper surface of the side panel forming a table surface at which a seated user is able to dine;

so that each side panel has a second depending position generally parallel to the side wall;

and a support stand for supporting the rectangular container which has a first erected position in which the container is supported in a raised position for use by a plurality of seated diners at the side panels and a second collapsed position in which the support stand is folded toward the base of the container.

In one arrangement, the pivot axis of the side panel is located at a top edge of the side wall. When combined with an arrangement in which a bottom edge of the side panel is located at the base in the depending position, the height of the side panel is substantially equal to the height of the side wall. This construction allows for minimum volume in the storage position as the four side panels lie flat against the four vertical sides of the container. However the side panels can be located at lower positions on the side walls and/or can be larger than the side walls to provide a raised cooking surface and larger table panels for the diners.

Typically the side panel has a width equal to that of the side wall since again this provides the largest table surface available. Simple small side panels for supporting pots and the like are known but these are typically arranged only at respective sides and are small so that they cannot be used for effective dining.

In order to provide an attractive appearance and to provide heat resistant surfaces, preferably each side panel comprises a steel plate with a removable wooden cover sheet attached to the steel plate and forming the table surface.

In one arrangement, the latching arrangement of each side panel comprises a slotted guide member at each side of the side panel each having a latching notch.

In accordance with a particularly important feature, preferably there is provided a heat shield arrangement between the combustion area in the container and a seated user at the side wall. This is a desirable device to reduce heat transference from the combustion in the container directly to the legs and upper body of the seated diner. In this way the diner can sit at the table surface and can reach over to the cooking surface to carry out communal grilling with the other persons seated around the full periphery of the grill surface. In this arrangement there is typically no cover of the type hinged at one side since the persons can be seated at all four sides.

In one arrangement, the heat shield comprises a double-walled firebox of the container for heat retention with ventilation slots in between the walls. The heat shield arrangement can typically include a panel underneath the side panel and lying parallel to the side wall. Typically the heat shield sheet arrangement comprises a separate metal panel attached below the side panel which is hinged and folds down with the side panel.

The cooking grill herein is preferably of the type using charcoal rather than gas or pellets or other forms of heat. In this case, a briquette/wired tray can be mounted in the container and holds charcoal and is vertically adjustable by a crank mechanism on one side wall. This allows a grilling temperature to be controlled effectively to provide good communal grilling while avoiding excess heat to the seated diners.

In order to effectively control the charcoal heating, preferably there is provided sliding ventilation doors on opposed side walls of the container that are adjustable using a handle at the side wall.

For portability when the grilling is complete and the grill is folded for transportation, preferably there is provided at the base a pull-out sliding drawer with a handle located at one side wall of the container. This can be used to remove ashes and to ensure that the container is emptied so that it can be collapsed into the transport position.

To enable simple loading with the side panels raised, there is provided a hinged briquette/steel sheet door with a handle at one side wall of the container. Thus the hinged access door can be opened to manipulate the fuel, which is preferably charcoal. The heat shield panels can be raised to allow access to these components at the sides of the container.

In one arrangement, the support stand includes ground wheels for transport of the cooking grill with the side panels and heat shields folded into the storage position along the sides of the container.

In one such arrangement, the support stand is connected to the bottom surface of the container and includes support components arranged such that in the second collapsed position the support stand holds the container in a first horizontal orientation and in a second vertical orientation.

In one such arrangement, in the horizontal orientation, the support stand supports the container on the ground wheels at one end and on a down-turned leg portion at the other end.

In one such arrangement, in the vertical orientation, the support stand supports the container on one end supported by the ground wheels and an up-turned leg portion lying along said one end.

Preferably, in the erected position, the support stand provides enough elevation to the grill and the side panels thereof to have chairs positioned underneath the side panels on each side of the container so as to surround the grill.

The arrangement herein thus provides a rectangular grill with four-fold down "table" sides wherein the wooden surfaces of the table sides and charcoal fueled firebox grill act as a combination group cooking and eating surface for an enhanced communal dining experience. Multiple users can cook at the same time while also eating and completing food preparation. The arrangement thus comprises a rectangular grill with four-fold down "table" sides wherein the combination of the above said collapsible wheeled-base stand and fold down table sides can be used to transport the grill in a vertical position or lock the grill in place to be used for cooking and eating in the horizontal position.

When in the horizontal position, the wheeled base provides enough elevation to the rectangular grill to have chairs positioned underneath the table surfaces and to surround the grill.

The steel sheets attached to the wooden cover sheets may be pivotally movable relative thereto so as to be movable to the depending position independently of the cover sheets to act as a heat shield to protect the lower body of the user.

The rectangular base stand, folding handles of the sliding ventilation doors and of the crank mechanism, and locking side panels and locking briquette door allow the entire assembly to be transported in one piece.

BRIEF DESCRIPTION OF THE DRAWINGS

One embodiment of the invention will now be described in conjunction with the accompanying drawings in which:

FIG. 8 is a top plan view of the arrangement as shown in FIG. 5.

In the drawings, like characters of reference indicate corresponding parts in the different figures.

DETAILED DESCRIPTION

Figure 1:
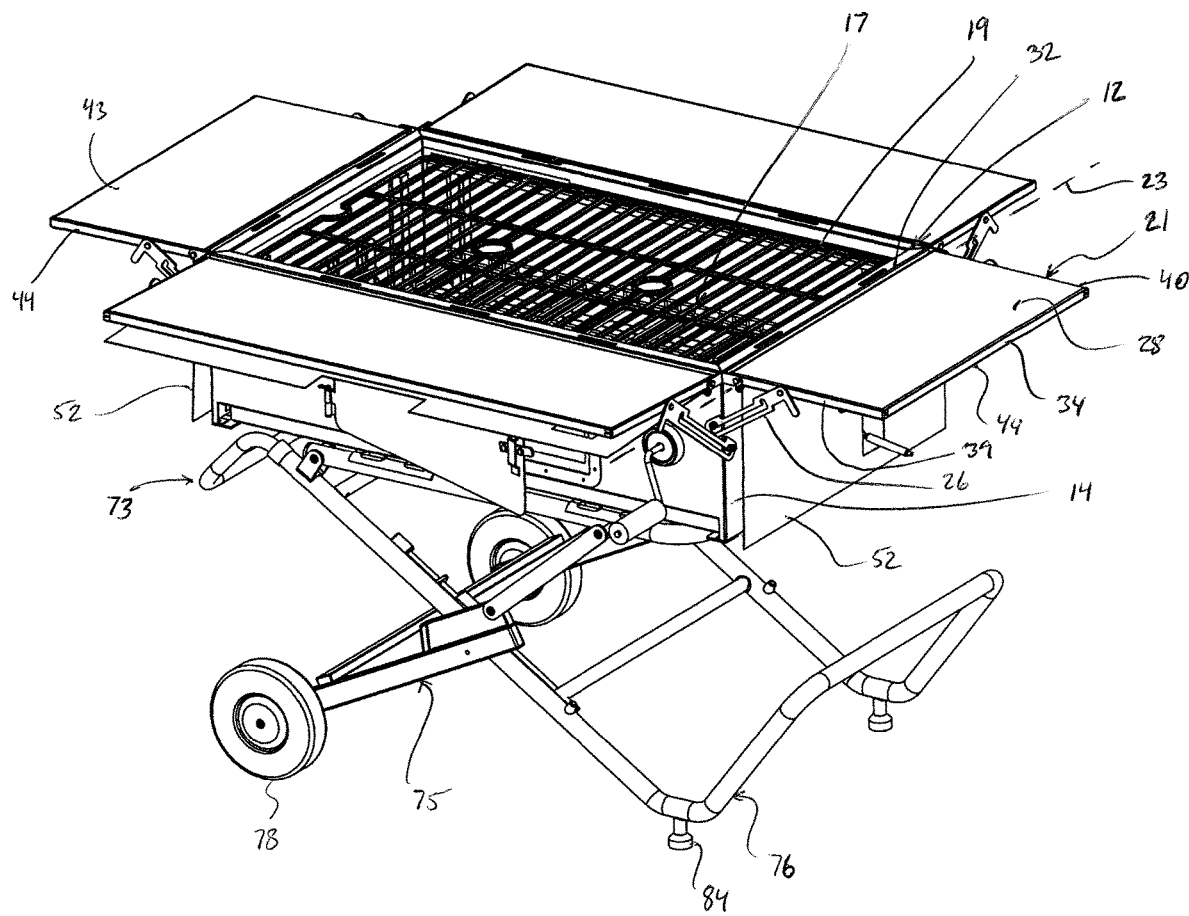
FIG. 1 is a perspective view of an arrangement of cooking grill according to the present invention with side panels thereof arranged in horizontal positions and a support stand of the arrangement of cooking grill in an erected position.

The accompanying figures show a cooking grill 10 which is arranged so as to be portable and also to provide a communal cooking experience where diners can be seated to dine at the same location as a cooking surface provided by the grill 10.

The cooking grill 10 comprises a rectangular container 12 having four upstanding side walls 14 and a base 15 confining an upper combustion area 17 defined by the container. A cooking surface 19 is defined over the upper combustion area 17 for receiving and supporting food materials or foodstuffs to be grilled by receiving heat from the combustion area 17 below the cooking surface 19. That is, the cooking surface 19 is disposed vertically above the combustion area 17 which is arranged to receive the fuel for combustion to generate heat for cooking foodstuffs placed on the cooking surface. The cooking surface may be in the form of a grill, a griddle, or a combination thereof in which a partial area of the cooking surface forms a grill and a second area of the cooking surface is in the form of a griddle so that both types of cooking can be performed in parallel.

Each side wall 14 of the container has a side panel 21 mounted thereon for pivotal movement of the side panel about an axis 23 along the side wall. That is, the grill includes a plurality of panels 21 separate from the container walls 14 each of which is pivotally mounted on a respective one of the side walls for movement relative thereto about an individual axis 23 extending from one side of the respective side wall to the other side so as to be oriented generally horizontally when the container is disposed in a usual operating position with the cooking surface 19 facing upwardly. Thus, each side panel 21 has a first horizontal position, as shown in FIGS. 1-4, with a latching arrangement 26 holding the side panel projecting outwardly from the side wall with an upper surface 28 of the side panel forming a table surface at which a seated user is able to dine, and each side panel has a second depending position generally parallel to the side wall, as shown in FIGS. 5-8. That is, each side panel 21 is connected to the container 12 yet movable relative to the side wall 14 at which it is mounted so as to form in the horizontal position a tabletop adjacent the cooking surface 19 and in the depending position the side panel occupies minimal space additional to the volume of the container 12 so that the grill 10 remains suitably portable even with the side panels attached thereto. The side panels 21 are planar in shape, and the upper surface 28 of each movable tabletop panel is planar so that in the horizontal position thereof the surface 28 is substantially horizontally oriented.

Figure 2:
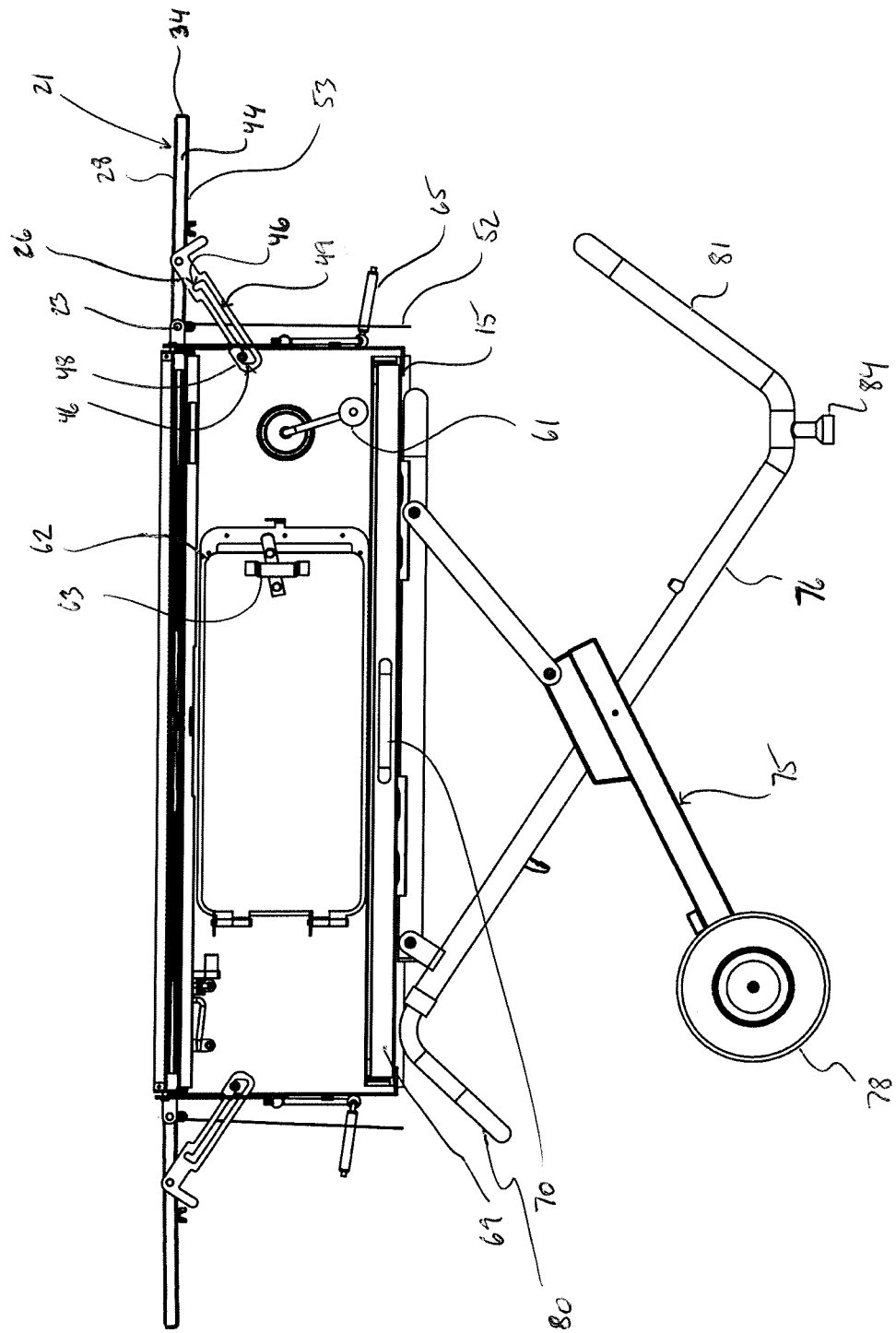
FIG. 2 is a side elevational view of the arrangement as shown in FIG. 1.
Figure 3:
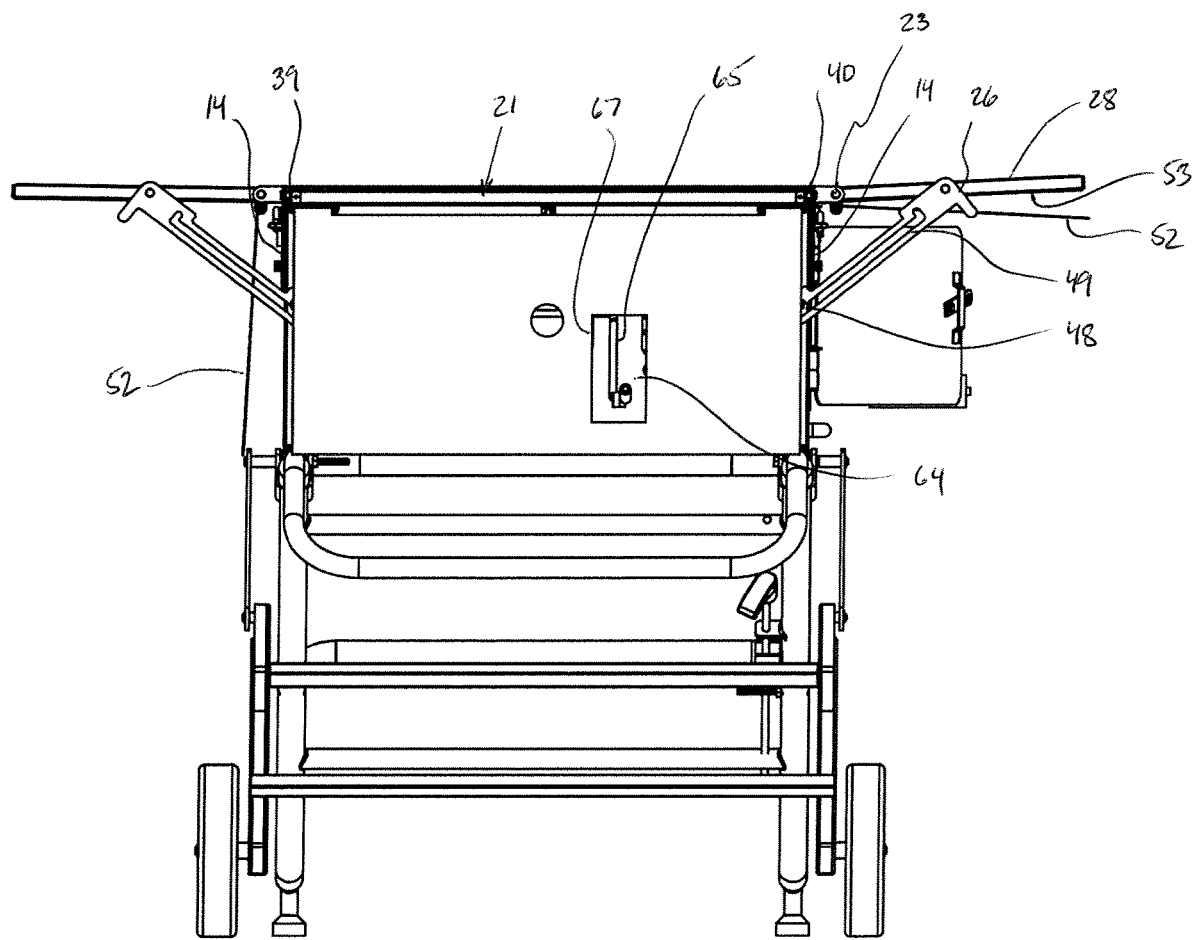
FIG. 3 is an end elevational view of the arrangement as shown in FIG. 1.

As more clearly shown in FIGS. 2-3, the pivot axis 23 of the respective side panel is located at a top edge 32 of the side wall 14. In other words, each pivot axis 23 is located at a height of the top edge 32 of the respective side wall 14 to which the corresponding panel 21 is attached. Conveniently, a bottom edge 34 of the side panel, which is distal to the axis 23, is located at the base 15 in the depending position (as shown more clearly in FIGS. 4-5) such that the height of the side panel 21 is substantially equal to the height of the side wall 14. A top or proximal edge 36 of the respective side panel 14 is disposed adjacent the side wall's top edge 32 and remains in substantially fixed location during the pivotal movement of the panel between the horizontal and depending positions. This construction allows for minimum volume in the storage position of the grill in which the panels 21 are arranged in the depending position as the four side panels lie flat against the four vertical sides of the container. However, in other arrangements which are not shown, the side panels can be located at lower positions on the side walls and/or can be larger than the side walls to provide a raised cooking surface and larger table panels for the diners.

Figure 4:
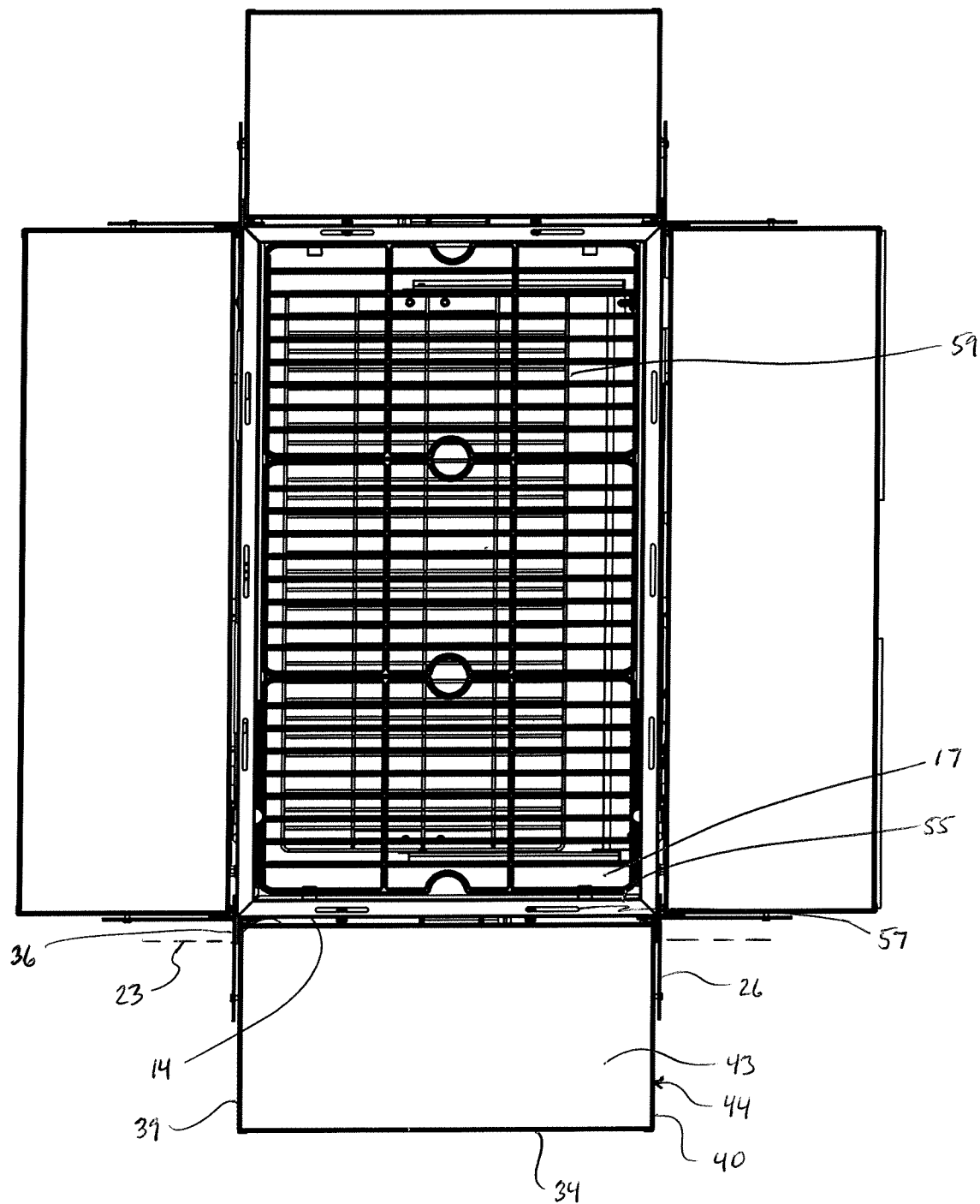
FIG. 4 is a top plan view of the arrangement as shown in FIG. 1.
Figure 5:
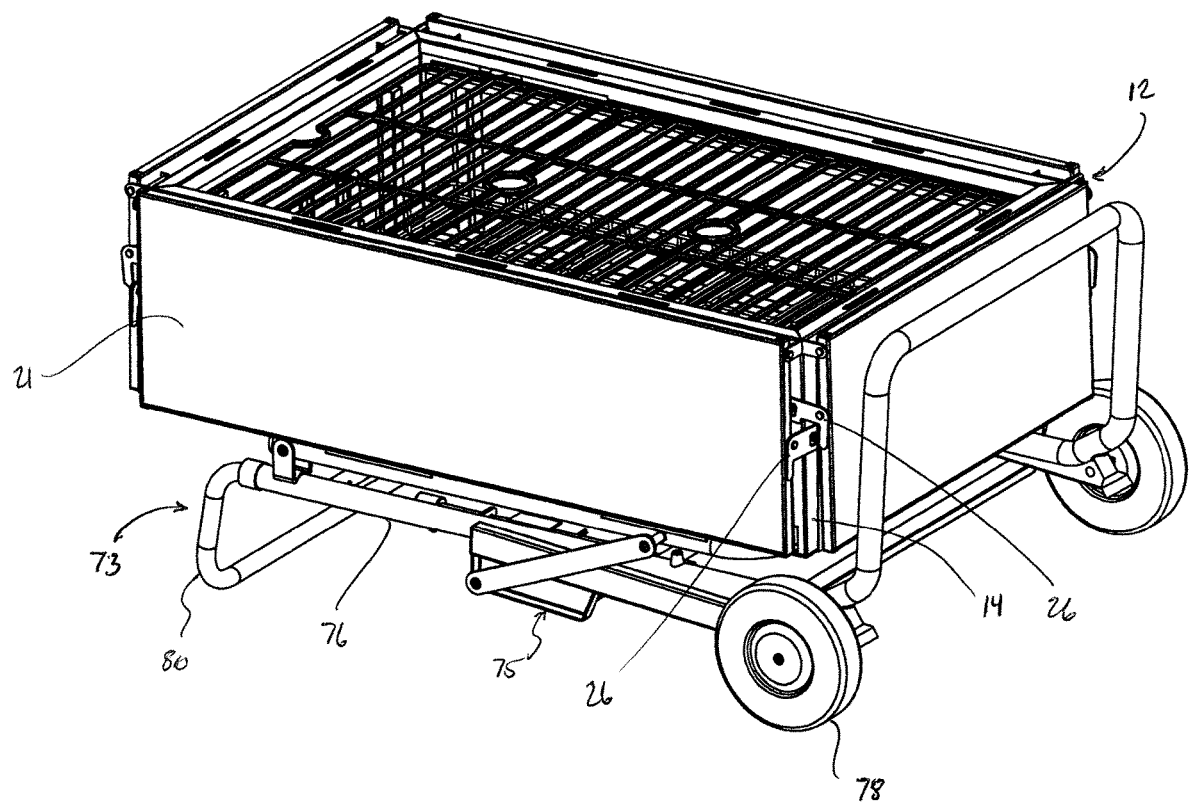
FIG. 5 is a perspective view of the arrangement of FIG. 1 with the side panels arranged in depending positions and the support stand in a collapsed position.
Figure 6:
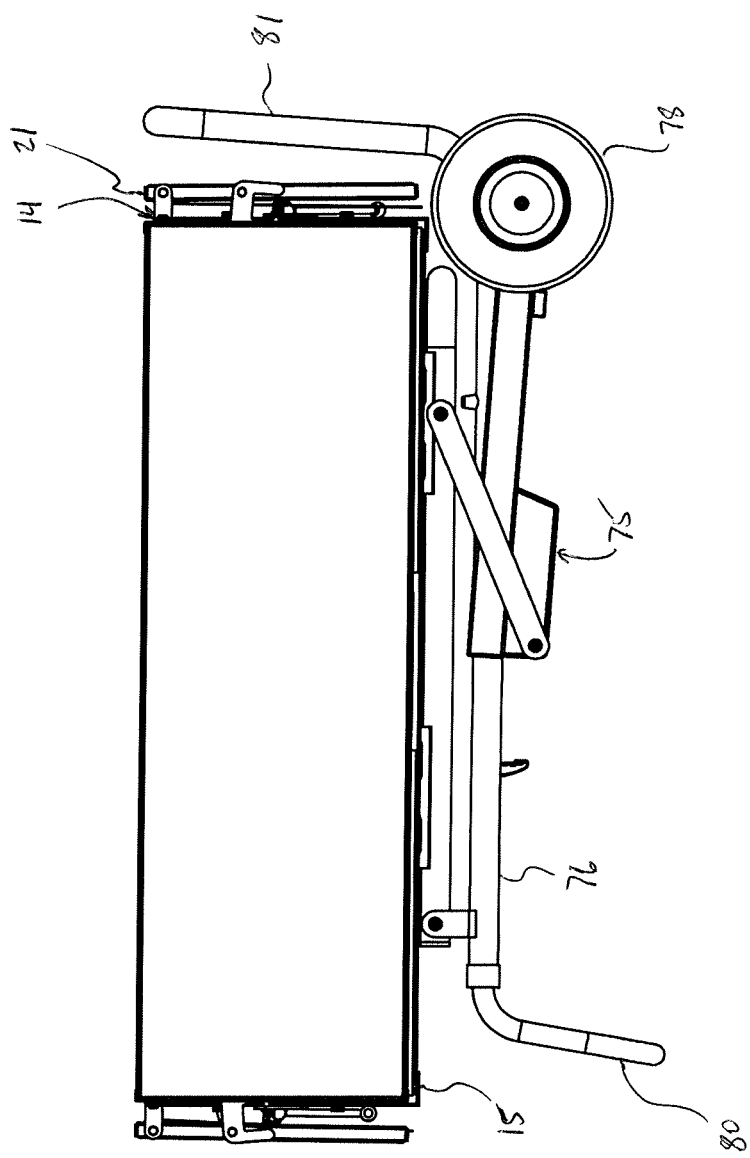
FIG. 6 is a side elevational view of the arrangement as shown in FIG. 5.
Figure 7:
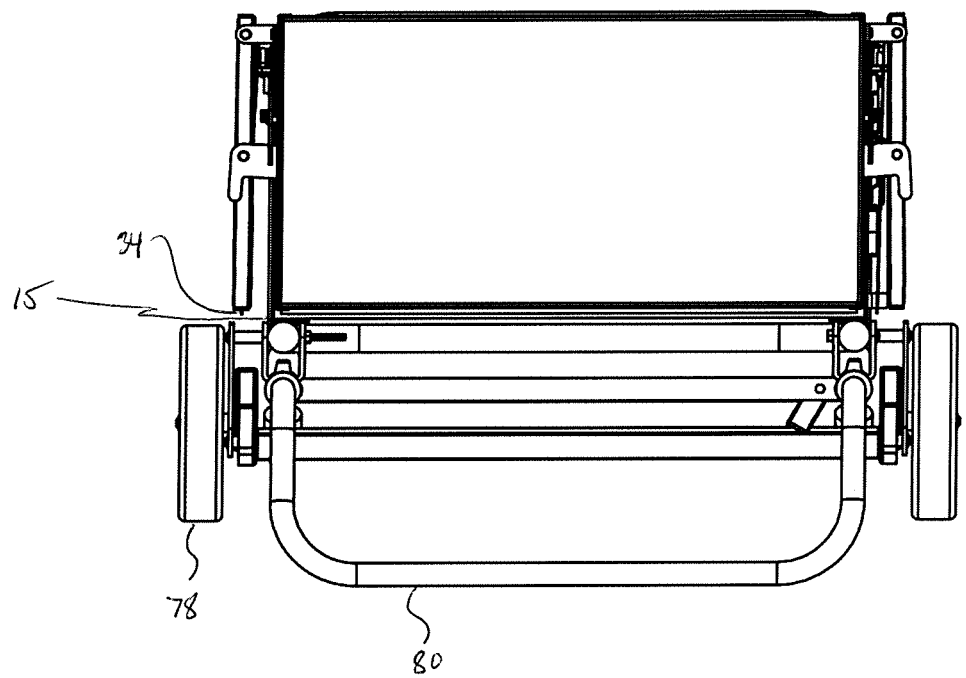
FIG. 7 is an end elevational view of the arrangement as shown in FIG. 5.

Referring to FIGS. 3-4, in order to maximize the surface area of each table surface and to provide a suitably sized surface which is effective for dining, the side panel 21 has a width between opposite side edges 39, 40 which is equal to that of the side wall 14 since again this provides the largest table surface available. The side panels 21 also have a generally rectangular periphery so as to conform to the substantially rectangular-shaped side walls 14.

Each side panel 21 comprises a removable wooden cover sheet 43 similar to a cutting board which forms the table surface and is removably attached to a metal frame 44 which in turn is pivotally coupled to the side wall 14. The cover sheet 43 therefore is removable for washing and can be replaced thereafter. In other arrangements which are not shown, the wooden cover sheet is replaced with a metallic for example steel tray which is removable for cleaning.

Referring back to FIGS. 2-3, to support each table-forming side panel 21 and guide it in the pivotal movement between use and storage positions, the latching arrangement 26 of each side panel comprises a slotted guide member at each side of the side panel delimited by the side edges 39, 40, and each guide member has a latching notch 46. The guide members are attached to the frame 44. Each guide member 26 is pivotally connected at one end to the movable side panel 21 at a location thereon intermediate the pivot axis 23 and the distal edge 34, but closer to the axis 23, and at an opposite end to the side wall by a pin 48 mated in a closed slot 49 defined by the guide member 26. Thus the guide member also moves relative to the side panel in movement between the horizontal and depending positions such that in the depending position of the side panel the guide members can be tucked in a gap formed between the adjacent side panel mounted on the adjacent side wall and that side wall, as the pivot axis 23 is defined at a spaced location from each side wall 14. This further reduces the volume of the container with attached side panels in the storage position. There is provided a latching notch 46 at each end of the closed slot 49 so that the side panel can be substantially secured in each of its positions. The closed slot 49 extends substantially linearly between its opposite ends at which the latching notches are located.

Still referring to FIGS. 2-3, further to the wooden cover sheets 43, each side panel 21 includes a steel plate 52 defining a metallic panel attached below the cover sheet via the frame 44 so as to move therewith between the horizontal and depending positions. However, the plate 52 is hingedly connected at an underside 53 of the panel so that the plate 52 can be moved from a position parallel to the cover sheet 43 to a position parallel to the side wall 14. Thus the plate 52 may be considered as part of the side panel as it is mounted thereon and movable therewith but it acts separately from the table forming portion of the panel to provide a heat shield arrangement between the combustion area 17 in the container and a seated user at the side wall 14. This is desirable for reducing heat transference from the combustion in the container 12 directly to the legs and upper body of the seated diner. In this way the diner can sit at the table surface provided by the side panel arranged in the horizontal position and can reach over to the cooking surface to carry out communal grilling with the other persons seated around the full periphery of the grill surface.

The heat shield arrangement of the illustrated arrangement also includes a double-walled firebox of the container for heat retention, which is most clearly shown in FIG. 4, comprising a pair of peripheral walls each encompassing the combustion area 17 and spaced apart so as to form an inner peripheral wall generally indicated at 55 and an outer peripheral wall indicated at 14 which already designates the exterior side walls of the container 12. The outer peripheral wall encompasses both the combustion area 17 and the inner peripheral wall 55. A gap between the inner and outer peripheral walls is enclosed but is communicated with an external environment of the container 12 by a plurality of ventilation slots 57 formed in between the walls at locations spaced about the periphery of the container.

The cooking grill of the illustrated arrangement is of the type using charcoal rather than gas or pellets or other forms of heat. In this case, a briquette/wired tray 59 is mounted in the container 12 within the combustion area 17 as more clearly shown in FIG. 4, so as to be below the cooking surface 19, and holds charcoal and is vertically adjustable by a crank mechanism 61 on one of the side walls as more clearly shown in FIG. 2. That is, the tray 59 is arranged to be vertically movable relative to the cooking surface 19 upon rotation of the crank mechanism 61 which is transformed by a conventional arrangement into a vertical displacement of the charcoal tray so as to bring the fuel supported on the tray either closer to or further away from the foodstuffs carried thereon. This allows a grilling temperature to be controlled effectively to provide good communal grilling while avoiding excess heat to the seated diners, as the primary area of heat transference from the container 12 to the seated diners is at the cooking surface 19.

It will be appreciated that even though charcoal is the preferred fuel source, this may be substituted for other fuel sources such as wood or pellets and in other arrangements the grill may be adapted so as to be heated by gas burners or electrically.

Referring to FIG. 2, to enable simple loading of fuel into the combustion area 17 of the container 12, there is provided a hinged briquette/steel sheet door 62 with a handle 63 at one side wall of the container. A hinge axis is arranged to extend along a height of the side wall in which the door is provided, which typically is a longer one of the two side walls of the container as in the illustrated arrangement. Generally, loading is performed with the side panels 14 raised. Thus the hinged access door can be opened to manipulate the charcoal fuel or load fuel as needed.

In order to effectively control the charcoal heating, the grill 10 includes sliding ventilation doors 64 on opposed side walls 14 of the container 12 that are adjustable using a handle 65 at the side wall, as more clearly shown in FIGS. 2-3. These ventilation doors 64 are slidably movable relative to the side walls in which they are provided generally within a plane of the respective wall, so as to selectively fluidically communicate the combustion area 17 with the external environment of the container 12 for airflow therebetween through the side walls of the container. Apertures 67 are formed in the heat shield plates 52 so that the control handle 65, which is foldable so as to lie generally flat against the side wall, can protrude through the aperture 67 so that the sliding ventilation doors 64 are still operable even when the heat shield plates 52 are in use, positioned generally parallel to the side wall.

For portability when the grilling is complete and the grill is arranged in a transport position, the grill 10 includes at the base 15 of the container a pull-out sliding drawer 69 with a handle 70 located at one side wall 14 of the container. This can be used to remove ashes generated by the consumed fuel source such as charcoal and to ensure that the container is emptied so that it can be collapsed into the transport position. In the illustrated arrangement, the handle 70 of the drawer is disposed on the same side wall 14 as that in which the access door 62 is provided. The heat shield panels 52 can be raised to allow access to the hinged access door 62 and the pull-out drawer 69 with their handles at the sides of the container.

In regard to portability, the grill 10 includes a support stand 73 for supporting the rectangular container 12, which has a first erected position as shown in FIGS. 1-4 in which the container 12 is supported in a raised position for use by a plurality of seated diners at the side panels 21 and a second collapsed position as shown in FIGS. 5-8 in which the support stand 73 is folded toward the base 15 of the container. That is, in the erected position the container is raised above a support surface on which the support stand 73 is adapted to rest, such as a ground surface, at a suitable height thereabove so that the diners can be seated at the side panels 21 arranged in the horizontal position to dine at the table surfaces 28 formed thereat. Preferably, in the erected position, the support stand 73 provides enough elevation to the grill and the side panels 21 thereof to have chairs positioned underneath the side panels 21 on each side of the container 12 so as to surround the grill. In the collapsed position, a height of the support stand 73 from a bottom thereof to the base 15 of the container is reduced so that the overall height of the grill 10 including that of the container and the support stand is made suitable for transport.

The support stand 73 is connected to a bottom surface of the container 12 which is defined by the base 15 in such a manner that the waste dump drawer 69 is movable independently of the support stand, and includes support components 75, 76 arranged such that in the second collapsed position the support stand holds the container in a first horizontal orientation and in a second vertical orientation.

Generally speaking, the support stand 73 is in the form of two movable portions 75, 76 each connected to the base 15 of the container and to the other one of the stand portions so as to provide folding movement between the erected and collapsed positions. The movable portions or support components 75, 76 are pivotally interconnected and are each pivotally attached to the container base 15. One portion 75 includes ground wheels 78 for transport of the cooking grill 10 with the side panels 21 and heat shields 52 folded into the storage position along the sides of the container. The first portion 75 is itself foldable so that in the erected position the ground wheels 78 are located generally at one end of the container 12 and in the collapsed position they are located at an opposite end of the container, that generally at which the first support portion 75 is pivotally connected to the container 12. A second portion 76 of the stand 73 is a substantially fixed shape component forming at one end thereof a down-turned leg portion 80 which is curved or bent away from the base 15 of the container and at an opposite end of the portion 76 an up-turned leg portion 81 which is curved towards a top of the side wall 14. In the collapsed position of the support stand, the up-turned leg portion 81 is located at one of the side walls 14 of the container so as to substantially register therewith, such that the folded side panel 21 arranged in the depending position is located intermediate the side wall 14 and the up-turned leg portion 81.

Thus, in the horizontal orientation of the grill, when the support stand 73 is in the collapsed position, the support stand supports the container 12 on the ground wheels 78 at one end and on the down-turned leg portion 80 at the other end. In the vertical orientation, the support stand 73 supports the container 12 on one end supported by the ground wheels 78 and the up-turned leg portion 81 lying along the same end.

The second support portion 76 of the stand 73 includes adjacent the up-turned leg portion 81 a plurality of feet 84 at opposite sides so that in the erected position the support stand 73 supports the container 12 on one end by the ground wheels 78 and the feet 84 at the other end.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A cooking grill comprising:
   a rectangular container defining an upper combustion area;
   a cooking surface over the upper combustion area for receiving and supporting food materials to be grilled by receiving heat from the combustion area below the cooking surface;
   the container having four upstanding side walls and a base confining the combustion area;
   each side wall having a side panel mounted thereon for pivotal movement of the side panel about an axis along the side wall;
   so that each side panel has a first horizontal position with a latching arrangement holding the side panel projecting outwardly from the side wall with an upper surface of the side panel forming a table surface at which a seated user is able to dine;
   so that each side panel has a second depending position generally parallel to the side wall;
   and a support stand for supporting the rectangular container which has a first erected position in which the container is supported in a raised position for use by a plurality of seated diners at the side panels and a second collapsed position in which the support stand is folded toward the base of the container.

2. The cooking grill according to claim 1 wherein the pivot axis of the side panel is located at a top edge of the side wall.

3. The cooking grill according to claim 1 wherein, in the second depending position, a bottom edge of the side panel is located at the base so that the height of the side panel is substantially equal to the height of the side wall.

4. The cooking grill according to claim 1 wherein the side panel has a width equal to that of the side wall.

5. The cooking grill according to claim 1 wherein each side panel comprises a steel plate with a removable wooden cover sheet attached to the steel plate and forming the table surface.

6. The cooking grill according to claim 1 wherein the latching arrangement of each side panel comprises a slotted guide member at each side of the side panel each having a latching notch.

7. The cooking grill according to claim 1 wherein there is provided a heat shield arrangement between the combustion area in the container and a seated user at the side wall.

8. The cooking grill according to claim 7 wherein the heat shield arrangement comprises a double-walled firebox of the container for heat retention with ventilation slots in between the walls.

9. The cooking grill according to claim 7 wherein the heat shield arrangement comprises a panel underneath the side panel and lying parallel to the side wall.

10. The cooking grill according to claim 9 wherein the heat shield sheet arrangement comprises a separate metal panel attached below the side panel which is hinged and folds down with the side panel.

11. The cooking grill according to claim 1 wherein a briquette/wired tray is mounted in the container and holds charcoal and is vertically adjustable by a crank mechanism on one side wall.

12. The cooking grill according to claim 1 wherein there is provided sliding ventilation doors on opposed side walls of the container that are adjustable using a handle at the side wall.

13. The cooking grill according to claim 1 wherein there is provided at the base a pull-out sliding drawer with a handle located at one side wall of the container.

14. The cooking grill according to claim 1 wherein there is provided a hinged briquette/steel sheet door with a handle at the one side wall of the container.

15. The cooking grill according to claim 1 wherein the support stand includes ground wheels for transport of the cooking grill.

16. The cooking grill according to claim 15 wherein the support stand is connected to the bottom surface of the container and includes support components arranged such that in the second collapsed position the support stand holds the container in a first horizontal orientation and in a second vertical orientation.

17. The cooking grill according to claim 16 wherein, in the horizontal orientation, the support stand supports the container on the ground wheels at one end and on a down-turned leg portion at the other end.

18. The cooking grill according to claim 16 wherein, in the vertical orientation, the support stand supports the container on one end supported by the ground wheels and an up-turned leg portion lying along said one end.

19. The cooking grill according to claim 1 wherein, in the erected position, the support stand provides enough elevation to the grill and the side panels thereof to have chairs positioned underneath the side panels on each side of the container so as to surround the grill.

* * * * *